Patented Aug. 30, 1932

1,874,656

UNITED STATES PATENT OFFICE

EDMOND T. TISZA, OF NEW YORK, AND BERNARD JOOS, OF YONKERS, NEW YORK, ASSIGNORS TO THE PYRIDIUM CORPORATION, OF NEPERA PARK, NEW YORK, A CORPORATION OF NEW YORK

ACYLATED AMINO AZO COMPOUNDS AND PROCESS OF PREPARING THE SAME

No Drawing.  Application filed July 11, 1929.  Serial No. 377,598.

This invention relates to new and useful medicinal substances, namely; acylated amino aromatic derivatives, such as acetylated-beta-phenylazo-alpha-alpha-diamino-pyridine, and methods of obtaining the same.

An object of the invention is the provision of a new and useful medicinal substance of the character set forth, suitable for use in germ infections, and of a nature to be dissolved either in the acid fluids of the stomach, or in the alkaline fluids of the intestines.

Another object is the provision of a relatively simple and inexpensive method of obtaining the said substances.

The preferred medicinal substances, according to the present invention, are chemical compounds having the probable formula $$R-N=N-R_1$$

where R represents a monocyclic radicle having aromatic properties and where $R_1$ represents a diamino pyridyl nucleus in which at least one of said amino groups is combined with an acyl group.

Beta-phenyl-azo-alpha-alpha-diamino-pyridine and the salts thereof are soluble in dilute acids and in water. The new substance described hereinafter, is very slightly soluble in cold water, and it is slowly saponified in the presence of small amounts of hydrochloric or other acids, and more easily saponified in weak alkali solutions. Because of this property it is very valuable for medicinal use, since it will not be eliminated so quickly from the stomach, but will be retained there for some length of time, and that part of the substance not dissolved in the stomach, will be saponified in the alkaline tracts of the intestines.

In order to obtain this desired result, acetyl groups are substituted for one hydrogen atom in each amido group of beta-phenyl-azo-alpha-alpha-diamino-pyridine. It is not possible to use diacetyl-diamino-pyridine as a starting material, as this compound apparently does not copulate directly with diazonium salt, but only after the acetyl group or groups are split off with the acid present.

The substance in question can be prepared the following way:

Example 100 grams beta-phenyl-azo-alpha-alpha-diamino-pyridine is dissolved in 200 cc. glacial acetic acid and 150 cc. acetic anhydride, and boiled on a reflux condenser for 20 minutes. Then the mixture is cooled, the precipitate filtered off, washed with cold acetic acid and water. The precipitate is then recrystallized out of methyl alcohol.

Properties of the product:

The new product recrystallized out of methyl-alcohol forms long slender needles of a reddish yellow color, with a melting point of 213-214° C. It is very slightly soluble in cold or hot water, slightly soluble in cold methyl-alcohol, and more easily in boiling methyl-alcohol. It is slightly soluble in cold or hot ether, and more easily soluble in cold or hot acetone. It is fairly soluble in cold, and much more easily in hot chloroform or toluol. It dissolves in cold dilute hydrochloric acid with a yellow color, and in hot dilute hydrochloric acid with a red color. That is, when dissolved in hydrochloric acid, the acetyl groups are split off, and hydrochloride of the base forms. The product is slightly soluble in cold dilute sodium hydroxide. When boiled with dilute sodium hydroxide, the product is first dissolved, after which the saponified base precipitates.

The reaction of the acetylating is the following:

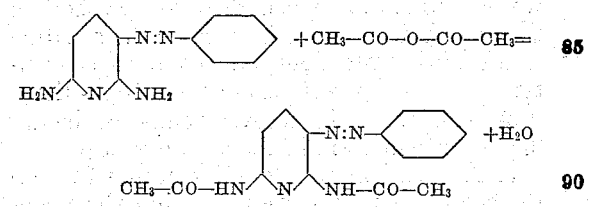

In order to prove that there are two acetyl-groups in the new compound, a quantitative determination through saponification is made in accordance with the following procedure:

0.5 gram of the substance is put in a flask with 20 cc. ethyl alcohol and 100 cc. N/10 sodium hydroxide and boiled on reflux condenser for two and a half hours. The alcohol is evaporated, and the precipitate, free base, is collected, quantitatively, dried and weighed. The filtrate is put, also quantitatively, into a distilling flask. 15 cc. sulphuric acid (1:5) and 200 cc. water is added, and the free acetic acid is distilled over. The evaporated water is replaced six times with 200 cc. water. The entire collected distillate is then titrated with N/10 sodium hydroxide. 33.60 cc. N/10 sodium hydroxide is used for titration, theoretically 33.65 cc. required. The weight of the base recovered is 0.358 gm., theoretically it should be 0.358 gram. The analysis proves conclusively, that there are two acetyl groups in the product.

Instead of the acetyl-group, other aliphatic or aromatic acyl groups, such as benzoyl, etc., can be used for acylating in a similar way phenyl-azo-alpha-alpha-diamino-pyridines, therefore we do not intend to limit ourselves to the acetyl product alone.

What is claimed as new is:—

1. As a new article of manufacture, a medicinal substance consisting of beta-phenyl-azo-alpha-alpha-diamino-pyridine, with an acyl group replacing one hydrogen atom in the amino groups.

2. As a new article of manufacture, a medicinal substance soluble through hydrolyzation in dilute acids or alkalies and composed essentially of acylated beta-phenyl-azo-alpha-alpha-diamino-pyridine.

3. As a new article of manufacture, a medicinal substance substantially insoluble in water, but soluble through hydrolyzation in the acid fluids of the stomach, or the alkaline fluids of the intestines, and composed essentially of beta-phenyl-azo-alpha-alpha-diamino-pyridine with acyl groups replacing one hydrogen atom in the amino groups.

4. As a new article of manufacture, a medicinal substance soluble though hydrolyzation in dilute alils or alkalies, and composed essentially of acetylated-beta-phenyl-azo-alpha-alpha-diamino-pyridine.

5. As a new article of manufacture, a medicinal substance substantially insoluble in water, but soluble through hydrolyzation in the acid fluids of the stomach or the alkaline fluids of the intestines, and composed essentially of beta-phenyl-azo-alpha-alpha-diamino-pyridine with acetyl-groups replacing one hydrogen atom in the amino group.

6. A chemical compound suitable for use in medicinal preparations having the probable formula $$R-N=N-R_1$$

where R represents a monocylic radicle of the aromatic series and where $R_1$ represents a diamino pyridyl nucleus in which at least one of said amino groups is combined with an acyl group.

Signed at Yonkers in the county of Westchester and State of New York this 9th day of July A. D. 1929.

DR. BERNARD JOOS.
EDMOND T. TISZA.